United States Patent
Berry et al.

(10) Patent No.: US 7,162,346 B2
(45) Date of Patent: Jan. 9, 2007

(54) VEHICLE CONTROL METHOD AND APPARATUS

(75) Inventors: Adrian Berry, Banbury (GB); Tim Slaney, Birmingham (GB); Adrie Breugelmans, Warwickshire (GB); Jan Prins, Solihull (GB); Derek Jones, Coventry (GB); Nick Moore, Leamington Spa (GB); David Andrew Clare, Oxfordshire (GB); David Armstrong, Birmingham (GB); Richard Cook, West Midlands (GB); Keith Gary Reginald Parsons, Cofton Hackett (GB); Sam Anker, Coventry (GB); David Inch, Banbury (GB); Scott Dicken, Warwick (GB); Phil Guest, Warwick (GB); Andrew Cotta, Cheltenham (GB)

(73) Assignee: Ford Global Technologies, LLC, Dearborn, MI (US)

( * ) Notice: Subject to any disclaimer, the term of this patent is extended or adjusted under 35 U.S.C. 154(b) by 352 days.

(21) Appl. No.: 10/873,023

(22) Filed: Jun. 21, 2004

(65) Prior Publication Data
US 2005/0004732 A1   Jan. 6, 2005

(30) Foreign Application Priority Data
Jun. 19, 2003   (GB)   ................... 0314236.1

(51) Int. Cl.
*B60W 10/00*   (2006.01)
*G06F 17/00*   (2006.01)
*B60R 16/02*   (2006.01)
*B60T 8/00*   (2006.01)

(52) U.S. Cl. ............................ 701/48; 701/36; 701/1; 701/91

(58) Field of Classification Search .................. 701/36, 701/37, 48, 51, 57, 67, 69, 1, 70, 91, 93
See application file for complete search history.

(56) References Cited

U.S. PATENT DOCUMENTS

| 5,487,002 | A | * | 1/1996 | Diller et al. | 701/1 |
| 5,991,827 | A | * | 11/1999 | Ellenby et al. | 710/8 |
| 6,226,581 | B1 | * | 5/2001 | Reimann et al. | 701/48 |
| 2004/0039510 | A1 | * | 2/2004 | Archer et al. | 701/48 |

FOREIGN PATENT DOCUMENTS

| EP | 1 355 209 A1 | 10/2003 |
| GB | 2 357 159 A | 7/1999 |
| WO | WO 03/058359 A1 | 7/2003 |

* cited by examiner

*Primary Examiner*—Tan Q. Nguyen
(74) *Attorney, Agent, or Firm*—Fredrick Owens

(57) ABSTRACT

A vehicle mode controller, a driving mode collecting means, and a plurality of subsystem controllers including an engine management system, a transmission controller, a steering controller, a brakes controller and a suspension controller, provide an improved system and method of operating a vehicle control system in a host vehicle in a manner suitable for a respective driving surface in a plurality of different off-road surfaces and terrains such as might be encountered when driving off-road. An improved method is provided for controlling a vehicle control system by avoiding unplanned combinations of subsystem configuration modes and minimizing the transition time when changing between subsystem configuration modes.

18 Claims, 12 Drawing Sheets

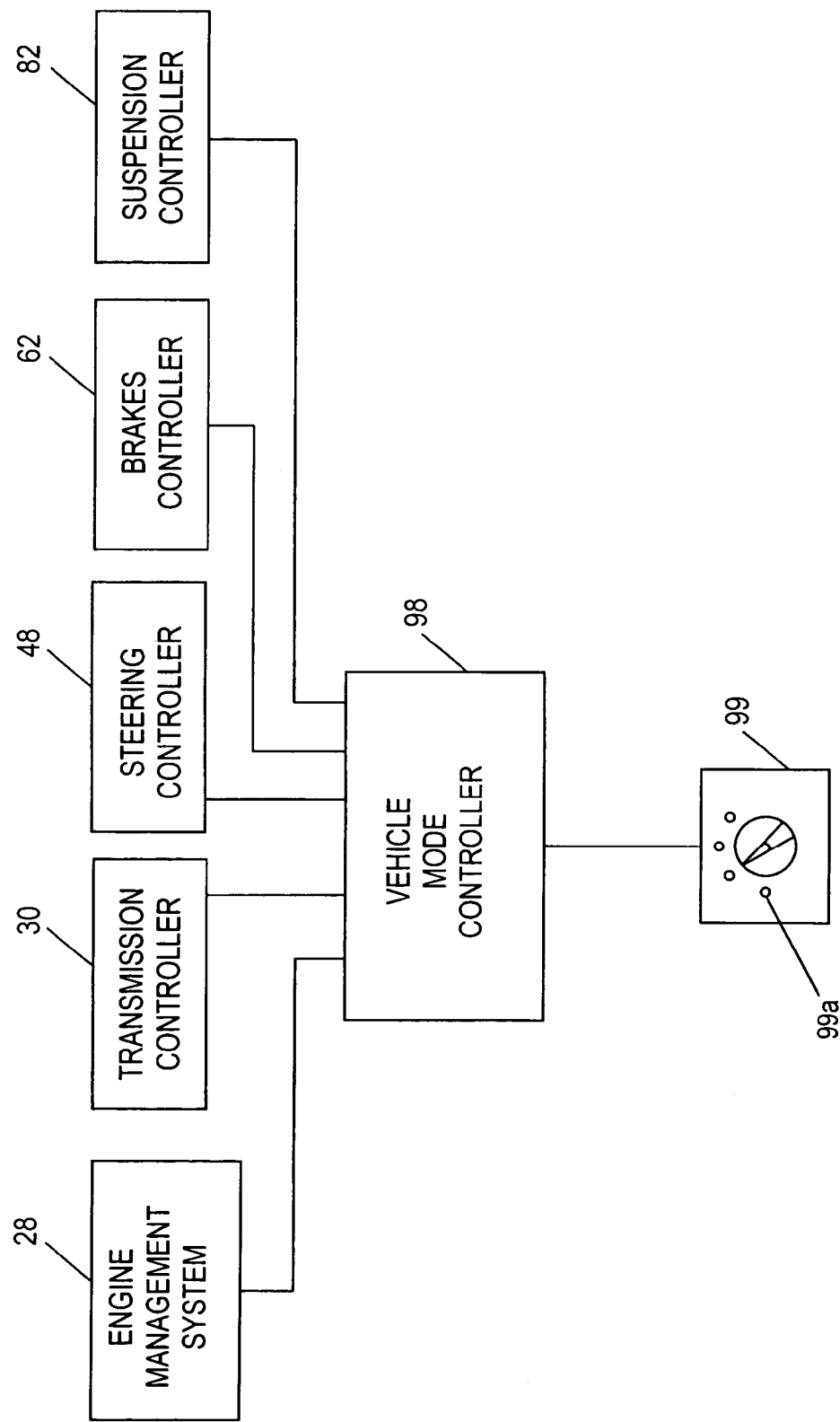

| | | Motorway | Country Road | City Driving | Towing (On Road) | Dirt Tracks (Developing World Road) | Snow/Ice (Scandanavian/North American Conditions) |
|---|---|---|---|---|---|---|---|
| Suspension Ride Height | High | | X | X | X | X | X |
| | Standard | X | | | | | |
| | Low | X | | | | | |
| Side / Side Air Interconnection | Closed | X | X | X | X | X | X |
| | Open | | | | | | |
| Steering Assistance Level | High | Speed Proportional | Speed Proportional | Speed Proportional | Speed Proportional | Speed Proportional | Speed Proportional |
| | Low | | | | | | |
| Brake Pedal Efforts | High | X | X | X | X | X | X |
| | Low | | | | | | |
| A.B.S. Mode | High mu | X | X | X | X | | |
| | Low mu | | (X) | | | X | X |
| | 'Plough' Surface | | X | | | | |
| E.T.C. Mode | High mu | X (2) | X | X | X | X | X |
| | Low mu | | | | | | |
| D.S.C. Mode | High mu | X | X | X | Towing Mode | X | X |
| | Low mu | | | | | | |
| Throttle Progression | Quick | X | (X) | X | (X) | X | X |
| | Slow | X | X | X | X | X | X |
| Transfer Box | High Range | X | X | X | X | X | X |
| | Low Range | | | | | | |
| Auto Transmission | Normal Mode | X | X | X | X | X | X |
| | Performance Mode | | X | | | | |
| | Snow Mode | | | | | | X |
| | Sand Mode | | | | | | |
| | Manual Mode | | (X) | | | | |
| Centre Diff Lock | Open | X | X | X | X | X | X |
| | Locked | | | | | | |
| Rear Diff Lock | Open | X | X | X | X | X | X |
| | Locked | | | | | | |

*Fig. 5*

| | | Grass | Sand | Boulder Crossing | Mud |
|---|---|---|---|---|---|
| Suspension Ride Height | High | | | X | |
| | Standard | X | X | | X |
| | Low | | | | |
| Side / Side Air Interconnection | Closed | | | X | |
| | Open | X | X | X | X |
| Steering Assistance Level | High | Speed Proportional | Speed Proportional | X | Speed Proportional |
| | Low | | | X | |
| Brake Pedal Efforts | High | X | X | | X |
| | Low | | | X | |
| A.B.S. Mode | High mu | | | X | |
| | Low mu | X | | X | X |
| | 'Plough' Surface | | X | | |
| E.T.C. Mode | High mu | | | X | |
| | Low mu | X | X | X | X |
| D.S.C. Mode | High mu | | X | X | |
| | Low mu | X | X | | X |
| Throttle Progression | Quick | X | | | |
| | Slow | | X | X | X |
| Transfer Box | High Range | X | X | | |
| | Low Range | | | X | X |
| Auto Transmission | Normal Mode | | | | |
| | Performance Mode | | | | |
| | Snow Mode | X | | | |
| | Sand Mode | | X | | |
| | Manual Mode | | | X | X |
| Centre Diff Lock | Open | | | | |
| | Locked | X | X | X | X |
| Rear Diff Lock | Open | X | (X) | X | X |
| | Locked | | | X | X |

*Fig. 6*

VEHICLE CONTROL METHOD AND APPARATUS

FIELD OF THE INVENTION

The present invention relates to the control of vehicles, in particular to the coordinated control of a number of subsystems of a vehicle.

TECHNICAL BACKGROUND

Various systems are known in which operation of various subsystems of a vehicle can operate in different configuration modes so as to suit different conditions. For example, automatic transmissions can be controlled in sport, winter, economy and manual configuration modes in which the changes between gear ratios and other subsystem control parameters are modified so as to suit the prevailing conditions or the taste of the driver. Air suspensions are known with on-road and off-road configuration modes. Stability control systems can be operated at reduced activity so as to give the driver more direct control over the operation of the vehicle. Power steering systems can be operated in different configurations modes where the level of assistance is at different levels or varies in different ways. Vehicle transmissions can be switched to provide drive to different numbers of wheels. Also the locking or partial locking of differentials can be controlled to suit the prevailing driving conditions.

As the number of controllable systems increases, the driver will become faced with an increasing number of choices as to which configuration modes to select for each of the systems. Unless the driver is very experienced, this can become complicated and confusing.

Therefore, systems have been proposed in which the control of a number of the vehicle subsystems is coordinated by a central vehicle controller, which can be switched between a number of modes thereby controlling all of the subsystems in a coordinated way which is simple for the driver to control. Such a system is disclosed in EP-A-1355209.

Therein is described a vehicle control system arranged to control a plurality of vehicle subsystems each of which is operable in a plurality of subsystem configuration modes. The vehicle control system optimizes subsystem settings for the terrain and is operable in a plurality of driving modes in each of which it is arranged to select the subsystem configuration modes in a manner suitable for a respective driving surface.

However, although such a vehicle control system includes driving modes to coordinate the subsystems in order to optimize vehicle performance for the terrain, the driver will continue to have the ability to manually control individual subsystem functions from the passenger compartment. For example, the driver may have the ability to adjust the ride height of the vehicle available on the driving console. The ride height adjustment is a manual adjustment of the air suspension subsystem. It is possible that this manual request received by the suspension subsystem might be in conflict with a current or future command by the vehicle control system requiring a different suspension subsystem configuration. Known vehicle control systems might avoid this conflict by either restricting all manual command requests from the driver or overriding the vehicle control system. Unfortunately, these simple solutions often result in a complete bypass of the vehicle control system and fail to take advantage of the benefits associated with optimizing for the terrain. Therefore, it would be advantageous if the vehicle control system and the manual requests to the subsystems from the driver were integrated to allow the vehicle control system to continuously optimize the vehicle performance based on the driving terrain.

A primary purpose of any vehicle control system is to coordinate the transition of the vehicle subsystems from one set of control parameters to another set of control parameters. The vehicle control system described in EP-A-1355209 is a terrain optimization controller and includes a method of controlling a plurality of vehicle subsystems within a motor vehicle in a manner suitable for a respective driving surface. The vehicle control system pre-defines a set of planned combinations of subsystem parameters for each terrain driving mode selection available. Therefore, the vehicle performance on the terrain is optimized when these planned combinations of functionality of the subsystems occur.

However, vehicle control systems will sometimes confront circumstances where a subsystem cannot change to the pre-defined subsystem configuration mode requested. For example, in order to provide optimal performance in vehicle control system driving mode 'A', it is assumed that all of the subsystems are set to a corresponding ideal 'A' subsystem configuration mode. Instead, the vehicle control system is faced with one subsystem remaining in a 'C' mode while the others have changed into 'A' mode. Such a situation might occur when the driver manually overrides a control (e.g., the automatic transmission gearbox is in manual shifting, so the system is unable to select the appropriate shift map) or for safety reasons (e.g., the vehicle speed exceeds a threshold limit upon which it will not allow for raising the ride height). Therefore, the system may have to refuse the request to change to 'A' mode. Or, perhaps even more problematic is the need to retract the demand for the change to 'A' mode from those subsystems that have already implemented the change from the current mode. The fact that some of the subsystems might be partially changing raises the possibility of unplanned combinations of subsystem configuration modes.

Furthermore, when the vehicle control system determines that it is necessary to perform a mode change, due to the fact that control commands are issued over a serial network, the network can sometimes introduce variable latency times such that each subsystem receives the signal to change modes at different times. This latency translates into a window of time in which the vehicle is not at its' optimal performance level. Therefore, it would be advantages if the method of controlling the vehicle control system would minimize the actual time between the start and completion of a mode change so as to make negligible for all practical purposes the amount of time the vehicle is at less than optimal performance the new terrain. Moreover, it would be advantageous to provide a method of controlling a vehicle control system wherein each of the subsystems selects 'an' appropriate subsystem configuration mode during a transition between modes to insure that unplanned and untested combinations of subsystem configuration modes are not experienced and that the vehicle is optimized for the driving surface.

Therefore, to further improve the performance of motor vehicles including an integrated control systems as noted above, there is a need for an improved control method and apparatus which will minimize the transition time between subsystem configuration modes, avoid unplanned combinations, and maximize control of the vehicle modes when responding to a broad range of surfaces.

SUMMARY OF THE INVENTION

In a first aspect, the present invention comprises a vehicle control system for a vehicle which is operable in a plurality of driving modes. The system comprises a driving mode selector for providing a requested driving mode, a vehicle mode controller adapted to receive the requested driving mode from the driving mode selector, and at least one vehicle subsystem operable in a plurality of subsystem configuration modes, each adapted to receive from the vehicle mode controller the requested driving mode and to send continuously to the vehicle mode controller a status message indicating its current subsystem configuration and its ability to change to the requested driving mode. The vehicle mode controller is operable to communicate continuously the requested driving mode to each vehicle subsystem. The vehicle mode controller is further operable to initiate an evaluation of each subsystem configuration mode status and its ability to change modes. The vehicle mode controller is additionally operable to initiate simultaneously the change of all of the at least one vehicle subsystems to the requested driving mode upon affirmative completion of the evaluation and to confirm that all of the vehicle subsystems have changed to the requested driving mode.

The invention provides an improved apparatus and method for controlling the vehicle control system by avoiding unplanned combinations of subsystem configuration modes and minimizing the transition time when changing between subsystem configuration modes.

Preferably the driving mode selector comprises a manually-operated switch.

Preferably each of the subsystems is operable in a plurality of selectable subsystem configuration modes and in each of the driving modes the subsystem configuration modes are suitable for the requested driving mode.

At least one of said subsystems may be provided with a manual control means operable by the driver in a plurality of selectable subsystem configuration modes and said subsystem is configured to determine an appropriate subsystem configuration mode for the requested driving mode.

Preferably one of the subsystems comprises a suspension system which includes a manual input control means operable by the driver, and said plurality of subsystem configuration modes comprises a plurality of ride heights with the aim of always providing the ride height that is most likely to be most suitable for the requested driving mode.

The invention may then facilitate a method of controlling a suspension subsystem ride height that is most suitable for driving on a respective surface wherein if it appears that the driver has made a deliberate choice to put the vehicle in a condition that is also likely to be giving a benefit to the driver, such as off-road ride height selection, then this condition will be maintained when a driving mode change is made.

Preferably one of the subsystems comprises a fluid suspension system in which fluid interconnection can be made between suspensions for wheels on opposite sides of the vehicle, and said plurality of subsystem configuration modes provide different levels of said interconnection.

Preferably one of the subsystems comprises a steering system which can provide steering assistance, and said plurality of subsystem configuration modes provides different levels of said steering assistance.

Preferably one of the subsystems comprises a braking system which can provide braking assistance, and said plurality of subsystem configuration modes provides different levels of said braking assistance.

Preferably one of the subsystems comprises a brake control system which can provide an anti-lock function to control wheel slip, and said plurality of subsystem configuration modes allows different levels of said wheel slip.

Preferably one of the subsystems comprises a traction control system which is arranged to control wheel spin, and said plurality of subsystem configuration modes allows different levels of said wheel spin.

Preferably one of the subsystems comprises a yaw control system which is arranged to control vehicle yaw, and said plurality of subsystem configuration modes allow different levels of divergence of said vehicle yaw from an expected yaw.

Preferably one of the subsystems comprises a range change transmission and said subsystem configuration modes include a high range mode and a low range mode of said transmission.

Preferably one of the subsystems comprises a powertrain (or engine) management system which includes a powertrain control means and a throttle pedal, the subsystem configuration modes providing different levels of responsiveness of the powertrain control means to movement of the throttle pedal.

The invention may then facilitate a method of using different throttle maps for different off road conditions wherein a change is applied while the throttle pedal is applied. For example, the powertrain subsystem may be configured to select a throttle map such that the throttle pedal has a low sensitivity when the vehicle is being driven off-road, and to select a throttle map such that the throttle pedal is more sensitive to displacement when the vehicle is being driven on-road. The powertrain subsystem may further be configured to change-over gradually from one throttle map to another in a manner dependent upon throttle pedal position. For example, change-over can be effected within a pre-set fixed time period by gradually increasing (or decreasing) throttle opening at a variable rate which depends on the throttle pedal position measured at discrete time intervals during the change-over time period. Such a method (and alternatives) are described in greater detail in the applicants co-pending application GB 0406374.9.

Preferably one of the subsystems comprises a transmission system operable in a plurality of transmission ratios and including a transmission control means arranged to monitor at least one parameter of the vehicle and to select the transmission ratios in response, and wherein the subsystem configuration modes include a plurality of transmission configuration modes in which the transmission ratios are selected differently in response to said at least one parameter.

Preferably one of the subsystems comprises a differential system operable to provide a plurality of levels of differential lock, and the subsystem configuration modes are arranged to provide different levels of said lock.

Preferably the differential system is arranged to control the level of differential lock on the basis of a plurality of inputs, and to respond differently to said inputs in each of the modes. The differential may be a center differential, a front differential, or a rear differential.

Preferably one of the subsystems comprises a roll control system arranged to provide roll correction to reduce vehicle roll and the subsystem configuration modes provide different levels of roll correction of the vehicle, at least under some driving conditions.

Preferably one of the subsystems is a speed control system which includes a manual control means operable by the driver, arranged to control the speed of the vehicle when descending a hill. The speed control system may be arranged to control the vehicle to different speeds in the different configuration modes.

Preferably the driving modes include an off-road mode in which the subsystems are controlled in a manner suitable for driving on rough terrain and an on-road mode in which the subsystems are controlled in a manner suitable for driving on-road.

In a second aspect, the invention comprises a method of vehicle control in which the vehicle is provided with a vehicle mode controller, a driving mode selector and at least one vehicle subsystem. The method comprises the steps of receiving a requested driving mode in the vehicle mode controller from the driving mode selector, communicating continuously the requested driving mode from the vehicle mode controller to each vehicle subsystem, receiving in each vehicle subsystem from the requested driving mode from the vehicle mode controller, sending continuously from each vehicle subsystem to the vehicle mode controller a status message indicating its current subsystem configuration mode and its ability to change to the requested driving mode, initiating in the vehicle mode controller an evaluation of each subsystem configuration mode status and its ability to change mode, initiating in the vehicle mode controller the simultaneous change of all vehicle subsystems to the requested driving mode upon affirmative completion of the evaluation, and confirming in the vehicle mode controller that all of the vehicle subsystems have changed to the driving mode.

Preferably, there is included the further steps of providing a manually-controlled input to at least one of the vehicle subsystems for selecting a subsystem configuration, and in said one of the vehicle subsystems and in response to said manually-controlled input, and the received driving mode, determining an appropriate subsystem configuration.

The method thus enables controlling a plurality of vehicle subsystems within a motor vehicle in a manner suitable for a respective driving surface and minimizing unplanned combinations, by arranging for all driving modes being started within each subsystem simultaneously, by allowing the vehicle mode controller to request a driving mode change only when all the subsystems indicate that they are available for a change, and by allowing the vehicle mode controller to change to an available mode if one or more subsystems do not respond to the demand for a driving mode change within a short period of time, such as 1000 milliseconds.

Optionally, a device for conveying advice to the driver may be provided. This device can help the driver to maximize control of the vehicle driving modes when responding to a broad range of surfaces.

The present invention further provides a vehicle comprising a vehicle control system according to the first aspect of the invention.

Other advantages and features of the present invention will become apparent when viewed in light of the detailed description of the preferred embodiment when taken in conjunction with the attached drawings and appended claims.

BRIEF DESCRIPTION OF THE DRAWINGS

Preferred embodiments of the present invention will now be described by way of example only with reference to the drawings of which;

FIG. 4 is a representation of a vehicle mode controller controlling the subsystems of FIGS. 1 to 3 according to an embodiment of the invention;

FIGS. 5 and 6 make up a table showing operation of the vehicle mode controller and associated driving modes with subsystem configurations.

DETAILED DESCRIPTION OF THE PREFERRED EMBODIMENTS

Figure 1:
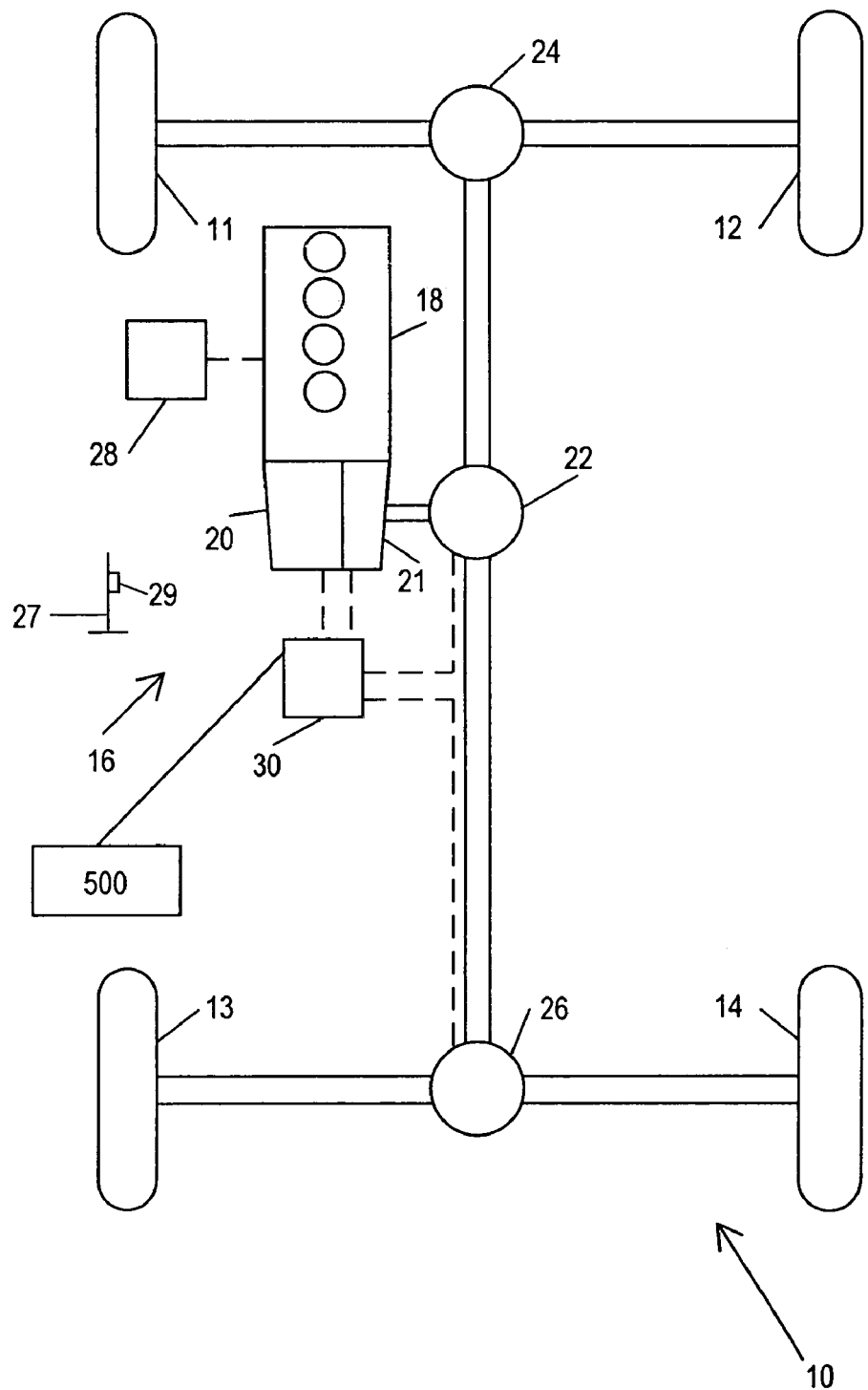
FIG. 1 is a diagrammatic representation of a powertrain subsystem of a vehicle.

Referring to FIG. 1, a vehicle 10 has four wheels 11, 12, 13, 14 and a powertrain 16 for providing driving torque to the wheels. The powertrain 16 comprises an engine 18, an automatic transmission 20 which transmits drive torque at any of a number of transmission ratios, via a transfer box 21 to the input side of a center differential 22. Front and rear differentials 24, 26 receive torque from the center differential 22 and transmit it to the front wheels 11, 12 and rear wheels 13, 14 respectively. An engine controller 28 in the form of an engine management system controls operation of the engine 18 so as to control its speed and output power and torque in response to inputs from the driver from a throttle pedal 27, the position of which is measured with a throttle pedal position sensor 29. A transmission controller 30 controls the transmission ratio of the automatic transmission 20, and the selection of high or low range in the transfer box 21. It also controls the center differential 22 so as to control the distribution of drive torque between the front and rear axles, and the rear differential 26 so as to control the distribution of drive torque between the two rear wheels 13, 14. The transmission controller 30 could also control the distribution of drive torque between the front two wheels 13, 14. The transmission controller 30 is also connected to a manual subsystem control means such as a switch 500 located in a driving compartment of the vehicle to allow the driver to manually select and deselect transmission options such as high range or low range or the transmission ratio of the automatic transmission 20.

Figure 2:
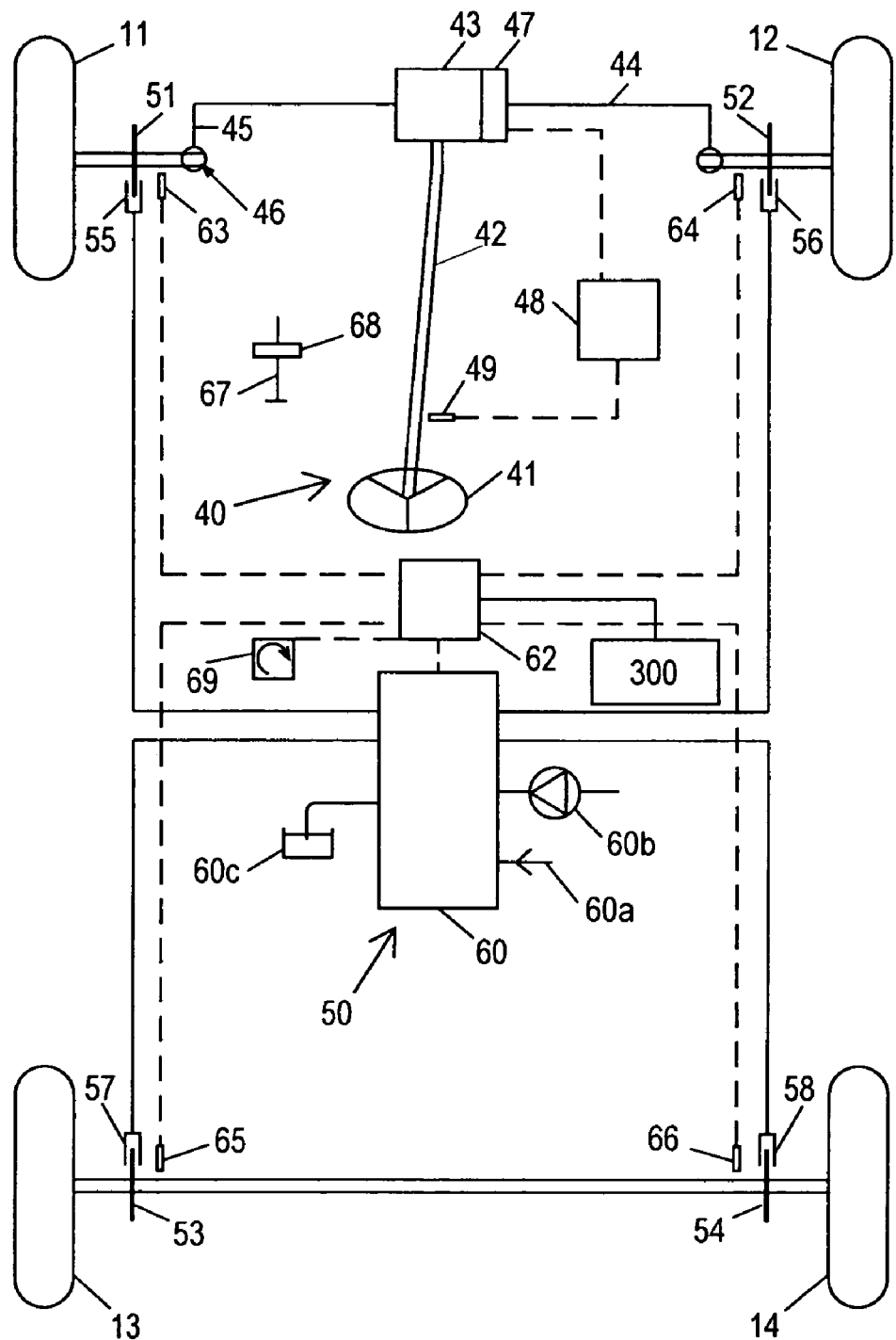
FIG. 2 is a diagrammatic representation of steering and brakes subsystems of the vehicle of FIG. 1.

Referring to FIG. 2, the vehicle further comprises a steering system 40 for steering the front wheels 11,12, and a brake system 50 for braking all four wheels 11, 12, 13, and 14. The steering system 40 comprises a steering wheel 41, a steering column 42 for transmitting steering input torque input by the driver to the steering wheel to pinion 43 of a rack and pinion steering system. The pinion 43 transmits the steering torque to a rack 44, which is connected to steering arms 45 by means of which it applies a steering force to the steering knuckles 46 of the front wheels to steer them. A PAS (power assisted steering) motor 47 applies steering forces to the rack 44 to assist the driver in steering the vehicle, under the control of a steering controller 48 which receives inputs from a steering angle sensor 49, which measures the steering angle of the steering wheel 41.

The brake system 50 comprises a brake disk 51, 52, 53, 54, and a brake caliper 55, 56, 57, 58 for each of the wheels each of which is actuated hydraulically from a hydraulic brake control block 60. The hydraulic control block 60 controls the hydraulic pressure and hence the braking torque at each wheel under the control of a brake controller 62 which receives wheel speed signals from wheels speed sensors 63, 64, 65, 66 at each of the wheels. A driver operated brake pedal 67 provides via a master cylinder the driver input to the brake system 50 and creates hydraulic pressure to operate the brakes at a first inlet port 60a to the control block 60, with the assistance of a brake booster 68. The booster 68 is also controlled by the controller 62 so as to vary the amount of assistance provided by the brake booster 68 and therefore the level of braking effort required from the driver to produce any particular level of braking torque at the wheels. A pump 60b is also provided which can provide hydraulic pressure to actuate the brakes independently of the brake pedal 67. The pump 60b is also controlled by the controller 62. Brake fluid is returned to a reservoir 60c on return from the brake calipers 55, 56, 57, and 58 from where it is supplied to the pump 60b or the master cylinder operated by the brake pedal 67. The brake controller 62 also receives an input from a yaw sensor 69 which measures the yaw rate of the vehicle. The brake controller 62 is also connected to a manual subsystem control means such as a switch 300 located in the driving compartment of the vehicle to allow the driver to manually engage and disengage pre-defined brake subsystem functions. Examples of the functions such as hill descent control will be described later.

Figure 3:
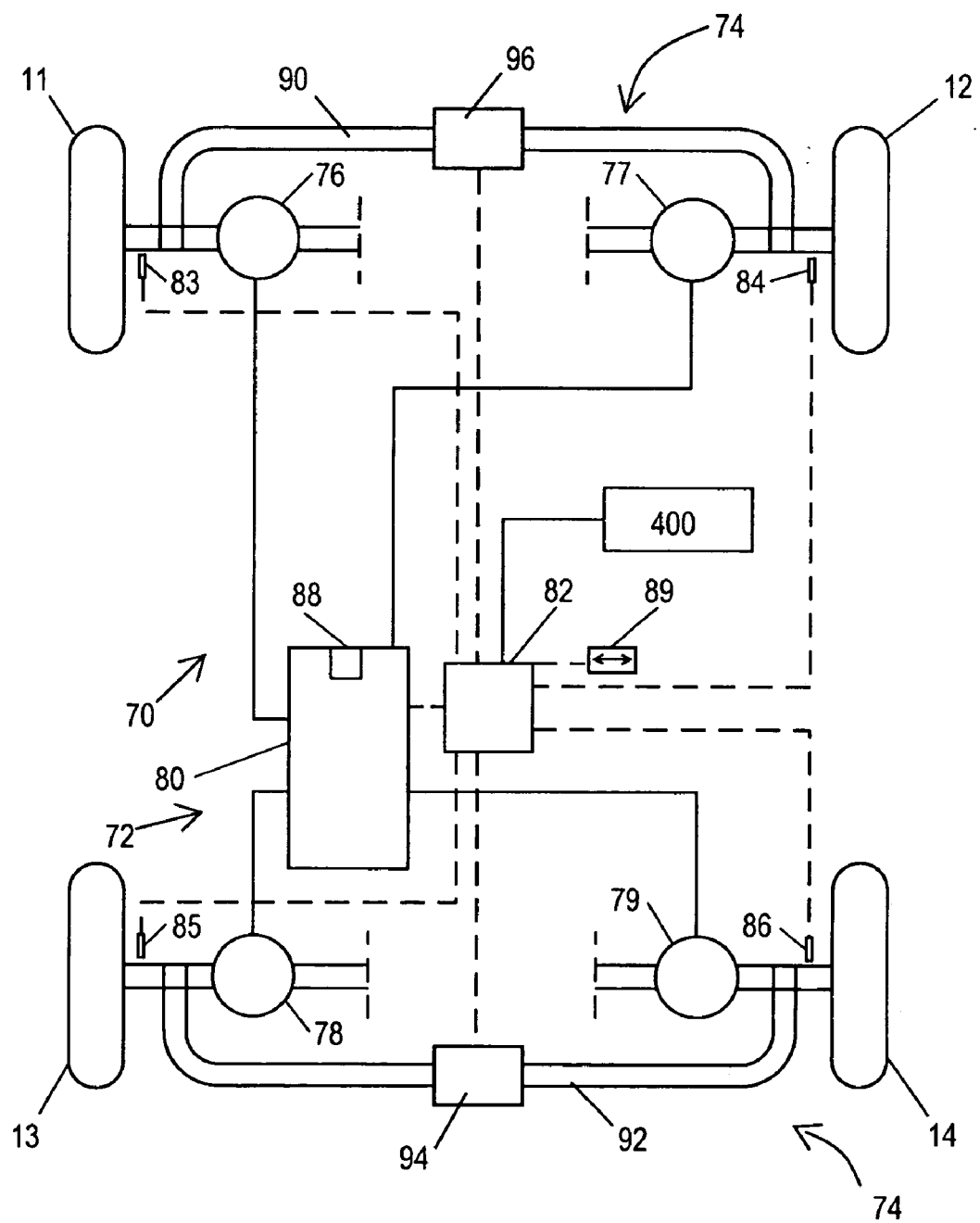
FIG. 3 is a diagrammatic representation of a suspension subsystem of the vehicle of FIG. 1.

Referring to FIG. 3, the vehicle further comprises a suspension system 70 which includes an active air suspension system 72 and an active roll control system 74. The active air suspension system 72 comprises an air spring 76, 77, 78, 79 at each wheel, and a valve block 80 which controls the ride height of each of the wheels 11, 12, 13, 14 and the spring rates of the air springs 76, 77, 78, 79 by controlling the air pressure in each of the air springs, the supply of air under pressure to each of the air springs and the release of air from the air springs. The valve block 80 further controls the degree to which the two front air springs 76, 77 are interconnected, the degree to which the rear air springs 78, 79 are interconnected, and the degree to which the front air springs 76, 77 are interconnected to the rear air springs 78, 79. The valve block 80 is controlled by an air suspension controller 82 which receives ride height signals from ride height sensors 83, 84, 85, 86 arranged to measure the ride height of each of the wheels 11, 12, 13, 14. The air suspension controller 82 is also connected to a manual subsystem control means such as a switch 400 located in the driving compartment of the vehicle. The air suspension control 82 receives manual subsystem control requests directly from the driver for air suspension subsystem functions such as raising or lowering the ride height. The suspension controller 82 can also measure the air pressure in each of the air springs 76, 77, 78, 79 using a pressure sensor 88 in the valve block 80, as well as the lateral acceleration of the vehicle using a lateral accelerometer 89.

The active roll control system 74 comprises a front anti-roll bar 90 which is connected between the two front wheels 11, 12 and acts to resist roll of the front of the vehicle, and a rear anti-roll bar 92 which is connected between the two rear wheels 13, 14 and acts to resist roll of the rear of the vehicle. Each of the anti-roll bars 90, 92 is in two halves with a rotary actuator 94, 96 acting between the two halves. These roll control actuators can actively increase (or decrease) the resistance to roll provided by the anti-roll bars by applying a roll correction torque under the control of the suspension controller 82. They can therefore control the roll stiffness of the vehicle.

Within the systems described above there are various functions which can be controlled in different ways depending on the prevailing driving conditions. These functions will now be described.

Referring to FIG. 3, the suspension system 70 is adjustable between a plurality of ride heights. In this case there are four possible ride heights: 'high' which is suitable for off-road driving; 'low' which is suitable for high speed driving, for example on motorways, where a low wind resistance is required; 'standard' which is between the 'high' and 'low' settings and is suitable for most normal on-road driving, and 'access' which is providing access to the vehicle as well as reducing the height of the vehicle when negotiating a low entry car park or similar maneuver. The suspension subsystem controller 82 automatically reverts from 'access' to 'standard' ride height above a threshold speed (approx. 8 kph and 40 kph respectively). The suspension controller 82 reverts from off road ride height to standard ride height above a threshold speed (circa 50 kph). The vehicle ride height can also be selected by pressing the manual switch 400 down once.

The interconnection between air springs of the active air suspension system 72 on opposite sides of the vehicle is variable between an 'open' condition where there is interconnection between the two sides of the vehicle, and 'closed' where there is no interconnection. In the 'closed' condition the roll stiffness of the vehicle is increased, and so is the overall spring rate of the suspension. This therefore makes the vehicle more suitable for driving on smooth surfaces at higher speeds. In the 'open' condition the roll stiffness is decreased, but the suspension can articulate more easily, making it more suitable for driving on rougher surfaces and at lower speeds. The interconnection valves are normally kept in the closed condition to provide high roll stiffness and stabilize the vehicle. Under certain conditions when there is a lot of vertical wheel travel the interconnection valves are opened to reduce resistance to this travel. However the system also needs to close the interconnection at high vehicle speeds to stabilize the vehicle because opening the interconnection reduces resistance to roll as well as resistance to articulation. The system can be varied to vary the amount of wheel travel that is required to cause opening of the interconnection valves, so that the interconnection will open more or less easily, and to vary the vehicle speed above which the interconnection will be kept closed. The system has three settings: standard, medium and maximum. In the standard setting the interconnection will happen up to quite high speeds, of about 50 kph but only at quite high levels of articulation. In the medium setting the interconnection will occur only at lower speeds, but also at lower levels of articulation. In the maximum setting interconnection will occur only up to low speeds, of about 15 kph, but at even lower levels of articulation.

Referring to FIG. 2, the brake pedal effort is controllable according to a plurality of, in this case two, basic characteristics. These are 'high' and 'low' requiring relatively high and low levels of braking effort from the driver. However further brake control functions can also be added to these basic characteristics under certain circumstances. For example a 'panic assist' function detects very rapid brake pedal depression indicative of emergency braking and provides an increased level of braking assistance in response.

The brake controller 62 provides an ABS (anti-lock) function which is also operable in a number of different configuration modes. There is a 'high mu' mode for use on surfaces with a high coefficient of friction. In this mode a relatively high level of slip is allowed to maximize deceleration rates. There is also a 'low mu' mode in which only much lower levels of slip are allowed so as to ensure that good control over the vehicle will be maintained at all times. Finally there is also a 'plough' mode which is designed for surfaces, such as sand and snow, in which a barrier of matter will build up in front of a wheel which is slipping under braking. In this mode higher levels of slip are allowed even than in the 'high mu' mode to take advantage of the braking effect of the build up of material in front of the wheels.

The brake controller 62 and the engine management system 28 also provide an E.T.C. (electronic traction control) function in which the brakes are applied using the pump 60b to counteract wheel spin caused by the powertrain 16 applying more torque to one or more of the wheels than can be transmitted through the tires to the ground. The detection of wheel spin is carried out using the wheel speed sensors 63, 64, 65, 66. If just one of the wheels is spinning, then that wheel is braked under the control of the brake controller 62. If enough of the wheels are spinning to indicate that the overall drive torque is too high for the surface on which the vehicle is traveling, the engine management system 28 intervenes to reduce the overall power output of the engine 18, thereby reducing wheel spin and maintaining traction. The E.T.C. function has 'high mu' and 'low mu' modes which, in similar manner to the A.B.S. function, allow higher and lower degrees of wheel spin, or slip, to allow more aggressive driving on higher friction surfaces, but maintain control on lower friction surfaces.

The E.T.C. function also has a sand mode which keeps wheel spin low at low speeds, following the 'low mu' mode, to prevent the wheels from digging into the sand, but allows more spin at higher speeds, following the 'high mu' mode because at higher speeds on sand higher levels of wheel spin are less of a problem and can even improve traction.

The brake controller 62 also provides a D.S.C. (dynamic stability control) function. This function monitors the vehicle speed and the steering angle using the wheel speed sensors 63, 64, 65, 66 and the steering angle sensor 49 and determines the expected yaw rate of the vehicle. This is compared with the actual yaw rate as measured by the yaw sensor 69, and the brakes are applied at individual wheels to control the vehicle yaw if it starts to deviate in an undesirable way from the expected yaw. Braking one or more of the outside wheels on a corner helps to neutralize oversteer, and braking one or more of the inside wheels on a corner helps to neutralize understeer. This function also has 'high mu' and 'low mu' modes in which the level of yaw deviation allowed is relatively high and relatively low respectively.

The brake controller 62 also provides a hill descent function. The hill descent control defines a target speed and uses the brakes to control the vehicle speed to the target speed as the vehicle descends a hill. The target speed has a default value which is nominally 6 kph, but can be increased by depressing the throttle pedal 27 and decreased by depressing the brake pedal 67 down to a minimum value of 3 kph. The default target speed can be varied depending on the mode selected. Referring to FIGS. 1, 2, and 3, the differential controller 30 is also arranged to receive inputs from the steering angle sensor 49 and the ride height sensors 83, 84, 85, 86, and to vary the locking torque of each of the center and rear differentials 22, 26 in response to those inputs. When high steering angles are detected the locking torque, in particular of the rear differential 26, is reduced so as to allow the wheels to rotate at different speeds as is required under cornering. When high levels of suspension articulation, indicated by large differences is ride heights between the wheels, is detected, the locking torque is generally increased as there is an increased likelihood of wheels slipping.

Referring to FIG. 1, the throttle pedal characteristic, which relates the amount of torque provided by the engine 18 to the position of the throttle pedal 27, can take a number of different forms. These include 'quick' characteristic which is highly progressive, causing the torque to increase rapidly at low degrees of pedal displacement and then to increase more slowly at higher degrees of pedal displacement, and a 'slow' characteristic in which the torque increases more slowly at lower levels of pedal displacement and more quickly at higher levels of pedal displacement. In an alternative to this type of arrangement the throttle pedal characteristic may relate the vehicle speed directly to the throttle pedal position. In this case the rate at which vehicle speed varies with throttle pedal position can be varied between more and less progressive characteristics.

The transfer box 21 can be shifted between a 'high range' and a 'low range' to select the range of gear ratios most suitable to the prevailing conditions in a known manner.

Referring to FIG. 1, the automatic transmission 20 has a number of subsystem configuration modes each of which defines when shifts between gears will take place, in response to changes in throttle pedal position, vehicle speed, engine speed, engine torque and throttle pedal position, and some other factors which are occasionally relevant such as gearbox temperature and ambient temperature. There is a 'normal' mode which provides a reasonable compromise between fuel economy and driving performance, a 'performance' which generally keeps the transmission in lower gears than in the normal mode, particularly when the driver is requesting a high level of driving torque to accelerate the vehicle, and a 'manual' mode in which the control of gear changes is given completely to the driver. There is also an 'ice' mode which generally keeps the transmission in higher gears than the normal mode, in particular under acceleration from rest, to avoid loss of traction due to wheel spin, and a 'sand' mode which keeps the transmission in relatively high gears at low speed to avoid excessive wheel spin which can result in the wheels digging themselves into the sand, but uses relatively low gears at higher speeds where a relatively high degree of wheel slip can be desirable to provide maximum traction, and lower gearing helps the engine 18 to remain in an operating region where the engine speed is high and the power output is high, thereby helping to avoid the vehicle becoming 'bogged down' by a lack of power.

The center differential 22 and the rear differential 26 each include a clutch pack and are controllable to vary the degree of locking between a 'fully open' and a 'fully locked' state. The actual degree of locking at any one time is controlled on the basis of a number of factors in a known manner, but the control can be adjusted so that the differentials are 'more open' or 'more locked'. Specifically the pre-load on the clutch pack can be varied which in turn controls the locking torque, i.e. the torque across the differential that will cause the clutch, and hence the differential, to slip. The front differential could also be controlled in the same way.

Referring to FIG. 4, a first embodiment of the invention including all of the subsystem controllers, that is the engine management system 28, the transmission subsystem controller 30, the steering subsystem controller 48, the brakes subsystem controller 62 and the suspension subsystem controller 82 are all connected to a vehicle mode controller 98 which integrates the configuration modes of operation of each of the subsystem controllers.

The vehicle mode controller 98 collects input regarding the vehicle driving terrain, vehicle performance, and the state of the vehicle subsystems into its memory. The vehicle mode controller 98 determines the appropriate control command for the driving surface and issues the command to all of the subsystem controllers. The subsystems, and each of the functions described above, are controlled so as to provide a number of driving modes for the vehicle. Each of the driving modes corresponds to a particular driving condition or set of driving conditions, and in each driving mode each of the functions is set to the function mode most appropriate to those conditions.

The driving modes are selected by a driving mode selector switch 99 which takes the form of one or more rotary knobs which can be rotated by the driver to select any of the driving modes displayed as being available. As an alternative to rotary knobs a touch screen, or a number of push buttons, one for each driving mode, could be used.

Referring to FIGS. 5 and 6, the driving modes include three on-road modes, namely a motorway mode, a country road mode and a city driving mode, four off-road modes, namely a grass mode, a sand mode, a boulder or rock crawl mode and a mud mode, and also a rough road mode, a towing mode, which in this case is arranged for towing on-road and can therefore also be considered one of the on-road modes, and an ice mode. The subsystem configuration modes that make up the vehicle driving modes are diagrammed in FIGS. 5 and 6.

Figure 7:
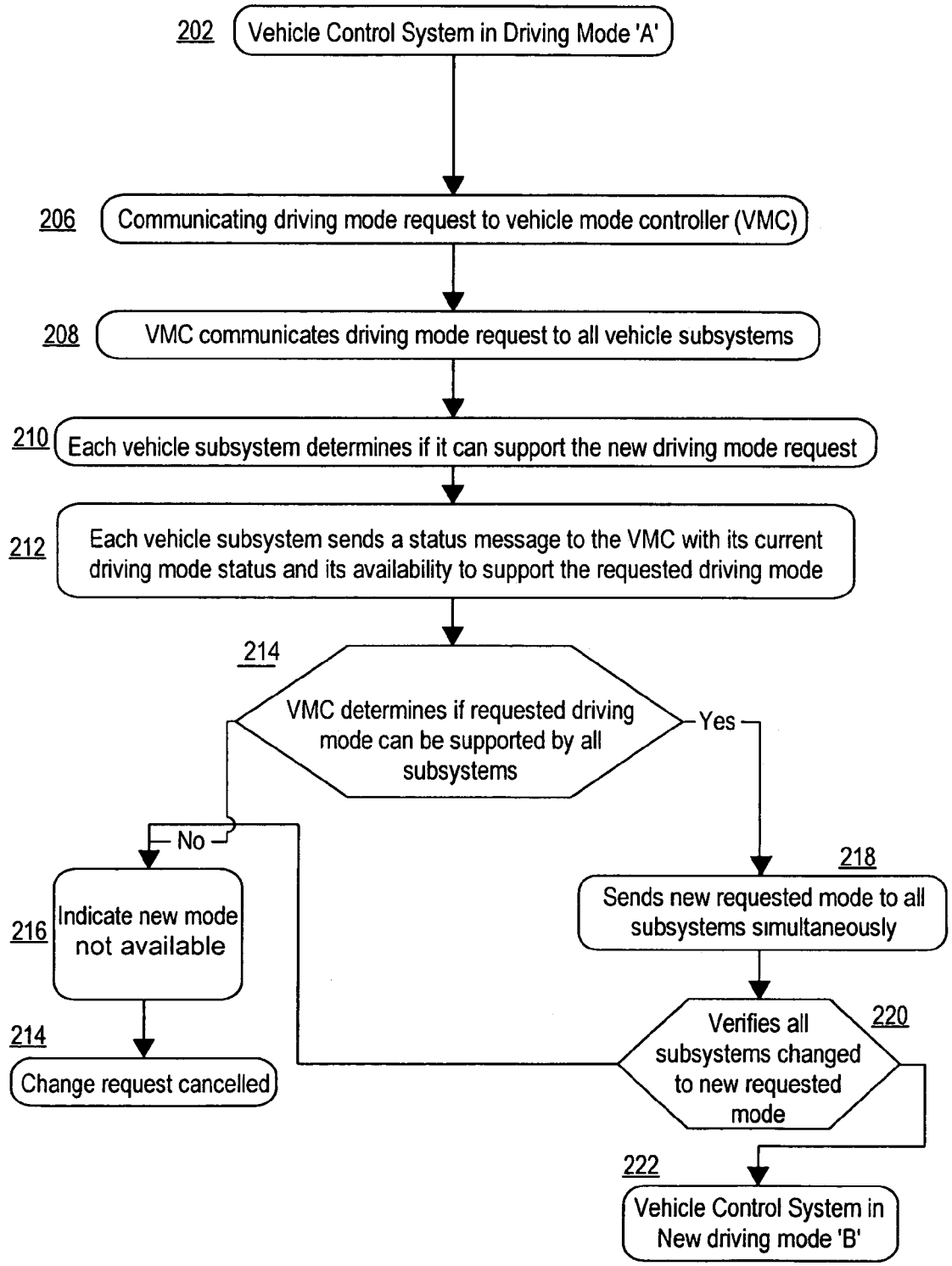
FIG. 7 is a flow chart of the vehicle mode changing process according to an embodiment of the invention.

Referring to FIGS. 4 and 7, we can describe this invention changing from the current driving mode to a new driving mode. The vehicle control system is currently operating in a driving mode 'A' 202 and broadcasts "driving mode A" to all of the vehicle subsystems. The selector switch 99 communicates the new driving mode to the vehicle mode controller (VMC) 206. As soon as the new driving mode is selected, the vehicle mode controller may acknowledge the movement by an indicating means such as a switch LED 99a, indicating that driving mode 'B' has been chosen 208. The vehicle mode controller may wait for a period (approximately 500 ms) before initiating the next step in order to allow the driver to settle on the desired driving mode 'B'.

The VMC broadcasts the new driving mode requests to all of the vehicle subsystems 208. It reviews whether the new driving mode 'B' is available based on information it receives from each of the vehicle subsystems. Each subsystem individually determines whether it can support the new driving mode 'B'. Each of the vehicle subsystem controllers continuously sends a status message to the VMC to indicate which driving mode it is currently supporting 212. Additionally, each vehicle subsystem controller sends information regarding whether the current subsystem has the ability to support the new driving mode 212. Therefore, the VMC collects and analyzes the information it receives from the all of the subsystems to determine whether mode 'B' is available from all of the vehicle subsystems 214.

If all of the vehicle subsystems cannot support the new driving mode 'B', the vehicle mode controller may continuously monitor the subsystem communications signals for a limited amount of time, (e.g. 60 seconds) looking for consistent availability of the new driving mode 'B' from all of the vehicle subsystems. Once a reasonable amount of time has expired without a consistent availability of the new driving mode, the mode change is cancelled 214. The vehicle mode controller will extinguish the switch LED 216.

When the requested driving mode 'B' is deemed to be stable and continuously available in all of the vehicle sub-systems, the VMC will simultaneously request all of the vehicle subsystems to immediately change to the appropriate subsystem configuration mode to support the new driving mode 'B' 218. Furthermore, the VMC will continuously monitor the vehicle subsystems for a limited period of time to confirm that the new driving mode 'B' has been supported by all of the vehicle subsystems 220. The vehicle mode controller broadcasts driving mode 'B' to all of the vehicle subsystems 222. By ensuring that all of the subsystems are simultaneously available the vehicle control system avoids unplanned combinations of subsystem configuration modes as well as minimizes the transition time when changing between subsystem configuration modes.

Figure 10:
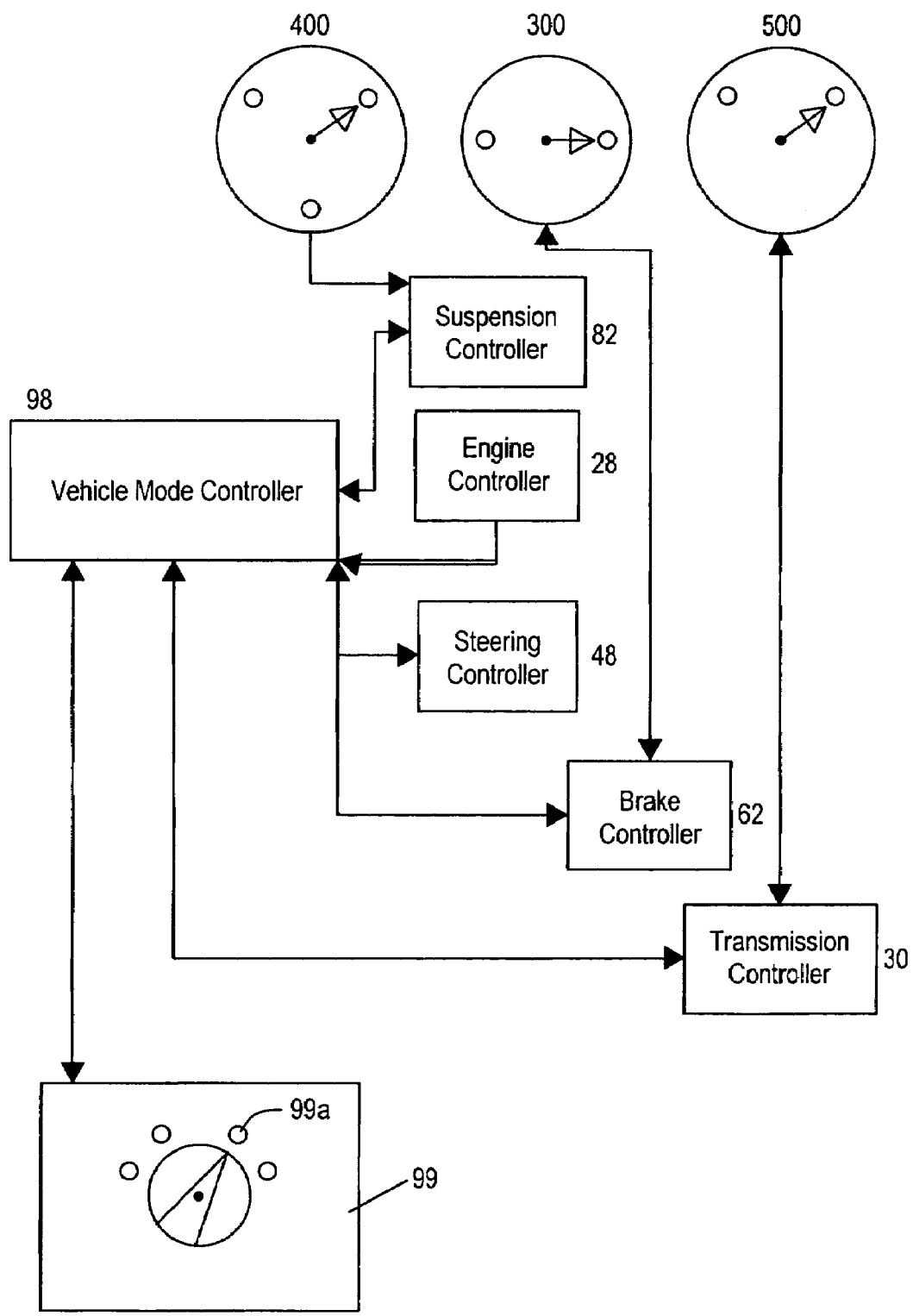
FIG. 10 is a representation of a vehicle mode controller controlling the subsystems of FIGS. 1 to 3 according to a second embodiment of the invention.

Referring to FIG. 10, a second embodiment of the invention is shown including all of the subsystem controllers, that is the engine management system 28, the transmission subsystem controller 30, the steering subsystem controller 48, the brakes subsystem controller 62 and the suspension subsystem controller 82 are all connected to a vehicle mode controller 98 which integrates the configuration modes of operation of each of the subsystem controllers. Additionally, one or more manual subsystem control means such as switches 300, 400, and 500 are connected to the brake, suspension, and transmission subsystem controllers respectively. The manual switches allow the driver to manually request each subsystem to perform specific functions such as changing the ride height of the vehicle by adjusting the air suspension subsystem. Each switch would be located inside the driving compartment of the vehicle.

Figure 11:
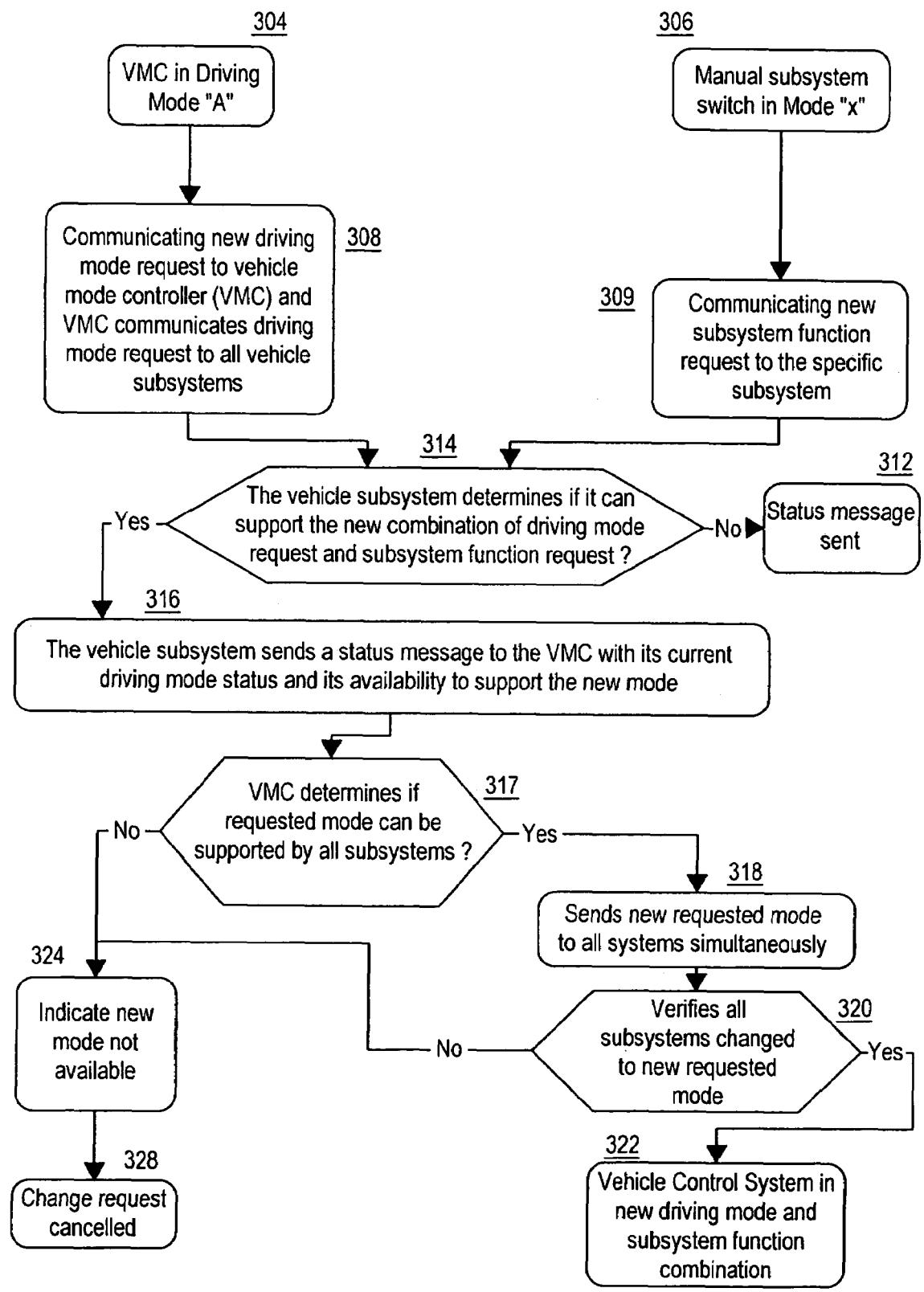
FIG. 11 is a flow chart of the vehicle mode changing process according to a second embodiment of the invention.

We can further describe the second embodiment of the invention when either the driving mode is changing or a change command occurs by using the manual subsystem control means. The addition of the manual subsystem control means to a subsystem requires that subsystem controller processes the combination of requests both from the driver with requests to optimize for the driving surface from the vehicle mode controller. Referring to FIG. 11, the vehicle system is currently optimized for both the driving mode and the manual subsystem control means 302. The vehicle mode controller is currently operating in a driving mode 'A' 304 with a manual subsystem control means set to configuration mode 'X' 306. A change event can begin when either a new driving mode or a new manually controlled subsystem function is selected, or a combination of both events. In either event, the driving mode from the driving mode selector switch is selected and the manual subsystem function from the manual switch is also selected. The driving mode selector switch communicates the new selected driving mode to the vehicle mode controller (VMC) 308, which in turn communicates it to each subsystem. Similarly, the manual subsystem switch communicates the requested subsystem function to the subsystem controller 309. As soon as the new driving mode is selected, the vehicle mode controller acknowledges the movement by an indicating means such as a switch LED 99a, indicating that the new driving mode has been chosen. The vehicle mode controller then waits for a period (approximately 500 ms) before initiating the next step in order to allow the driver to settle on the desired driving mode.

Each subsystem determines if an appropriate subsystem configuration mode can support the new combination of the request driving mode and the manual subsystem function request 314. If the subsystem cannot support the new combination, a status message is sent indicating that the new combination of driving mode and manual request is not available 312. Each vehicle subsystem continuously sends a status message to the VMC to indicate which driving mode it is currently supporting 316. Additionally, each vehicle subsystem sends information regarding whether the current subsystem has the ability to support the combined new driving mode and manual function request 316.

The vehicle mode controller analyzes in the next step whether the new driving mode and combined manual function request is available from all of the vehicle subsystems 317. If all of the vehicle subsystems cannot support the new driving mode, the vehicle mode controller continuously monitors the subsystem communications signals for a limited amount of time, (e.g. 60 seconds) looking for consistent availability of the new driving mode from all of the vehicle subsystems. Once the time has expired without a consistent availability of the new driving mode, the mode change is cancelled 328.

When the requested driving mode is deemed to be stable and continuously available in all of the vehicle sub-systems 317, the vehicle mode controller will simultaneously request all of the vehicle subsystems to immediately change to the appropriate subsystem configuration mode to support the new driving mode 318. Furthermore, the vehicle mode controller will continuously monitor the vehicle subsystems for a limited period of time to confirm that the new driving mode has been supported by all of the vehicle subsystems 320. By ensuring that all of the subsystems are simultaneously available the vehicle control system avoids unplanned combinations of subsystem configuration modes as well as minimizes the transition time when changing between subsystem configuration modes.

Figure 8:
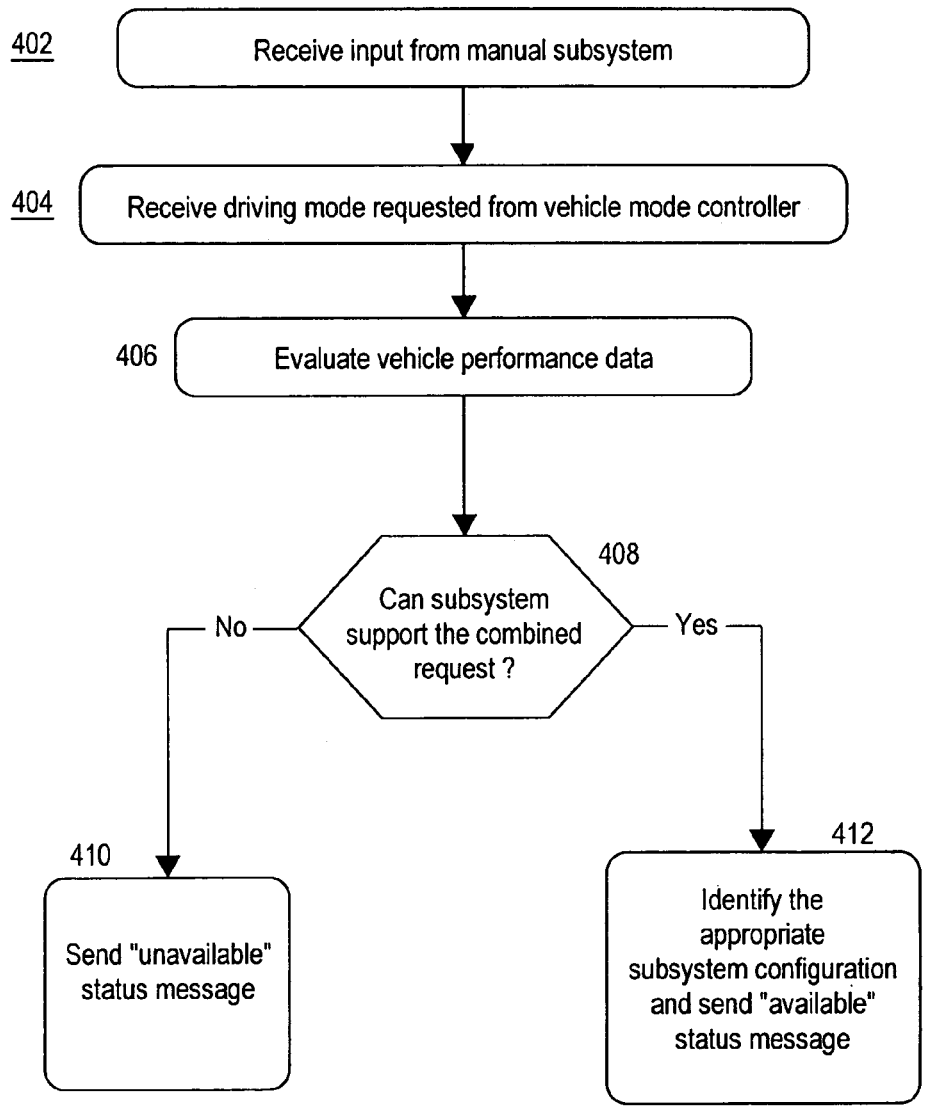
FIGS. 8 is a flow chart of the operation of a subsystem controller according to the second embodiment of the invention.

Referring to FIG. 8, the steps for controlling a subsystem with manual control means included in the second embodiment of the invention is now further described. The subsystem determines if an appropriate subsystem configuration mode can support the combined driving mode requested and the requested manual subsystem request 408. The subsystem does this by comparing the request received from the manual subsystem switch 402 with the driving mode request 404 and vehicle performance data 406 available to the subsystem. When the subsystem configuration determines that it can support the combined request, an appropriate subsystem configuration is identified and the subsystem sends a status message to the vehicle mode controller and the manual subsystem switch 412. To avoid unplanned combinations of subsystem configuration modes, a finite number of combinations of driving mode requests and manual subsystem requests can be identified and placed in a software table of 'appropriate' configurations.

Referring to FIG. 10, the air suspension controller is further described. The air suspension controller 82 coordinates the ride height selection during driving mode changes with the aim of providing the ride height that is most likely to be of benefit to the driver. The manual subsystem control means is a switch 400 and allows the driver to raise and lower the ride height and provides the air suspension controller 82 with direct input of the driver's current ride height preference.

The off road ride height is automatically selected in relevant driving modes. In the description that follows, three speed thresholds are used. Threshold X is the speed at which the vehicle ride height is reduced once the air suspensions system has decided that off road ride height is no longer required with the driving mode and range combination. Threshold X is proposed to be set relatively low at 5 kph. This is a speed which should be high enough to indicate that the vehicle is moving but low enough to ensure the vehicle is lowered by the time vehicle speed is increased significantly. Threshold Y is to be set to 20 kph. This is the speed threshold below which the air suspension will automatically raise the ride height when required by the driving mode and range combination. It is set low enough to provide a significant hysteresis with the threshold at which the vehicle is lowered but still at a speed level at which off road ride height will become a benefit because of the additional ground clearance. Threshold Z is the speed threshold at which the air suspension system will reduce the ride height to normal to reduce the center of gravity at high speeds. The value of Z will be approximately 50 kph but may also vary depending on vehicle acceleration (i.e. the vehicle will be lowered sooner if it is accelerating fast).

When the ride height is initially raised to off road height either by manual control means or by the selection of a prior driving mode, the off road height is maintained when switching between driving modes within low range. Similarly, off road height is maintained when switching to high range within the same driving mode.

The vehicle will automatically revert to normal height if changed into high range and then into standard mode, but only when the vehicle speed is above a certain threshold (5 kph). Alternatively, the driver can manually lower the vehicle to normal ride height at any time. The vehicle is lowered to normal ride height when dynamic or sport driving mode is selected, but not until the vehicle speed is above a certain threshold (5 kph).

The suspension subsystem will revert to normal ride height when above the off road ride height threshold speed (50 kph) but the driving mode remains selected. When the vehicle is subsequently slowed down again the suspension subsystem will revert to off road ride height if it is slowed down below a certain threshold (20 kph) and if it is in a driving mode that normally selects off road ride height (i.e. all modes except standard, in low range).

The driving modes that ask for increased ride height can be selected above the normal subsystem threshold speed but while the vehicle is above the threshold it will remain in normal ride height. The high ride setting will automatically be selected when speed drops below a 20 kph threshold.

If the vehicle is raised manually to off road ride height (from either access/crawl or normal) in a mode that requires the vehicle to be raised, the automatic ride height selection will follow all the rules as described above when the driving mode changes. If the vehicle is manually lowered to normal ride height from off road ride height in a mode that requires off road ride height, then the suspension subsystem controller will automatically select off road ride height again if the driving mode is changed to one that normally selects off road ride height.

If the vehicle is manually lowered to a normal ride height in a driving mode that does not require off road ride height, automatic ride height selection will follow all rules as described above when the driving mode is changed. Manually selected normal ride height will be maintained if selected in a mode where the driving mode normally selects off road ride height. This is also the case after restarting in a mode that normally selects off road ride height. The reset of a driving mode to standard driving mode after 6 hours will not affect height selection and the vehicle will remain in whatever ride height it was prior to the vehicle mode controller 98 driving mode defaulting. However, automatic selection of the appropriate ride height will follow subsequent changes in driving mode and transmission range combinations.

As described earlier, the vehicle control system requires off road ride height to be re-selected in some of the driving modes, when vehicle speed drops below 20 kph and if it was lowered by exceeding the air suspension speed threshold (see above). However, the driver is able to select access mode prior to the vehicle being raised (i.e. not yet slowed down enough) and this could give a conflict, with the driving mode demand upwards and the access demand downwards in ride height. The functionality in this case is that the vehicle will go into access mode as requested by the driver, but will raise to off road ride height as soon as access mode is no longer (pre-selected.)

Referring to FIG. 10, the brake controller 62 in the second embodiment of this invention is shown and will now be further described. The brake controller 62 will automatically switch on the hill descent control (HDC) function in some driving modes. The general principle behind the switching of HDC with driving mode selection is that the vehicle is switched to a condition likely to be of most benefit upon the selection of each mode and range combination. In addition, if it appears that the driver has made a deliberate choice to put the vehicle in a condition that is also likely to be giving a benefit (HDC switched on) then this condition will be maintained when a mode change is made. HDC is automatically switched ON via selection of some driving modes range combinations. The HDC is automatically switched OFF if selected by a first driving mode and the first driving mode is changed to a subsequent driving mode that does not require HDC selection. If the HDC is switched ON manually by the driver in a driving mode that does not require HDC, the HDC then stays switched ON regardless of which T.O. mode is selected next or whether this new driving mode requires HDC selection or not. If HDC is switched ON manually in a driving mode that requires HDC, it stays switched ON regardless of which driving mode is selected next and whether this requires HDC selection or not. If HDC is switched OFF manually in a mode that requires HDC, automatic selection will follow in a new driving mode, as appropriate. If the HDC is switched OFF manually in a driving mode that does not require HDC, automatic selection will follow in a new driving mode, as appropriate. Automatic (de)selection of HDC, as appropriate for the selected driving mode, will follow if the ignition has been switched off for more than 6 hours.

The principles outlined also apply if a driving mode is selected by the vehicle mode controller different to the one chosen by the driver, for example because the chosen driving mode is not available. Automatic (de)selection of HDC, as appropriate for the selected driving mode, will follow. The method chosen to achieve the above functionality is that the brake controller 62 will monitor the driving mode selected and it will switch the HDC ON/OFF itself, according to the rules outlined above, which will be programmed into its software. I.e. HDC on/off requests will not be issued directly by the vehicle mode controller.

Figure 12:
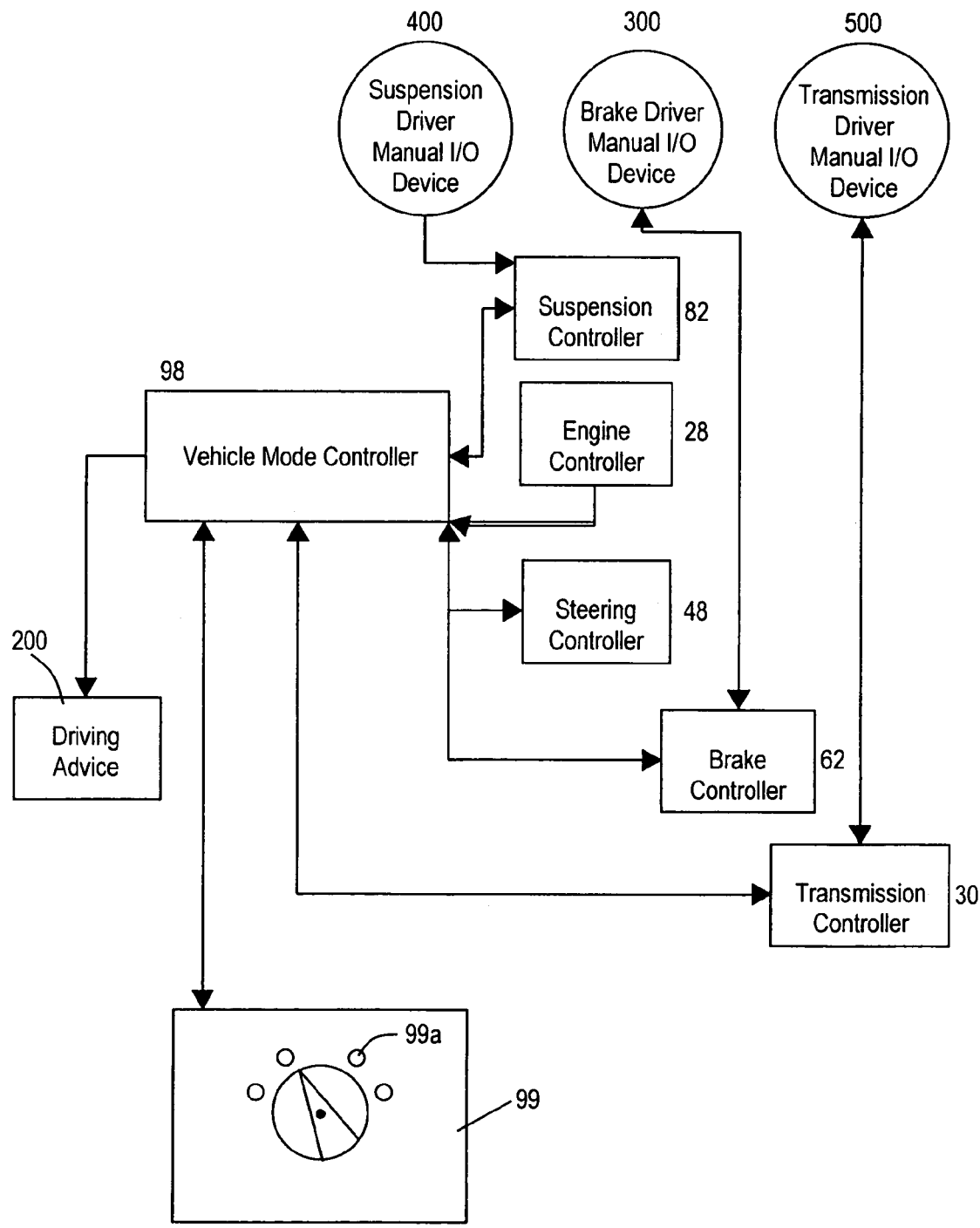
FIG. 12 is a representation of a vehicle mode controller controlling the sub-systems of FIGS. 1 to 3 according to a third embodiment of the invention.

Referring to FIG. 12, a third embodiment of the invention will now be described. In this embodiment all of the subsystem configurations are substantially the same as in the second embodiment, the third embodiment differing only in the addition of a means for providing driving advice 200 as will be described in more detail below. The third embodiment will therefore also be described with reference to FIGS. 1 to 3.

In FIG. 12, a third embodiment of all of the subsystem controllers, that is the engine management system 28, the transmission subsystem controller 30, the steering subsystem controller 48, the brakes subsystem controller 62 and the suspension subsystem controller 82 are all connected to a vehicle mode controller 98 which controls the configuration modes of operation of each of the subsystem controllers. Additionally, manual subsystem control means such as switches 300, 400, and 500 are connected to the brake, suspension, and transmission subsystem controllers respectively, and a means for providing driving advice 200 is connected to the vehicle mode controller. The driving advice apparatus 200 which may be integrated into the instrument console, is used extensively by the vehicle control system to display driving mode related vehicle information and driving advice related to optimizing the vehicle subsystems integrating the manual subsystem control means.

Figure 9:
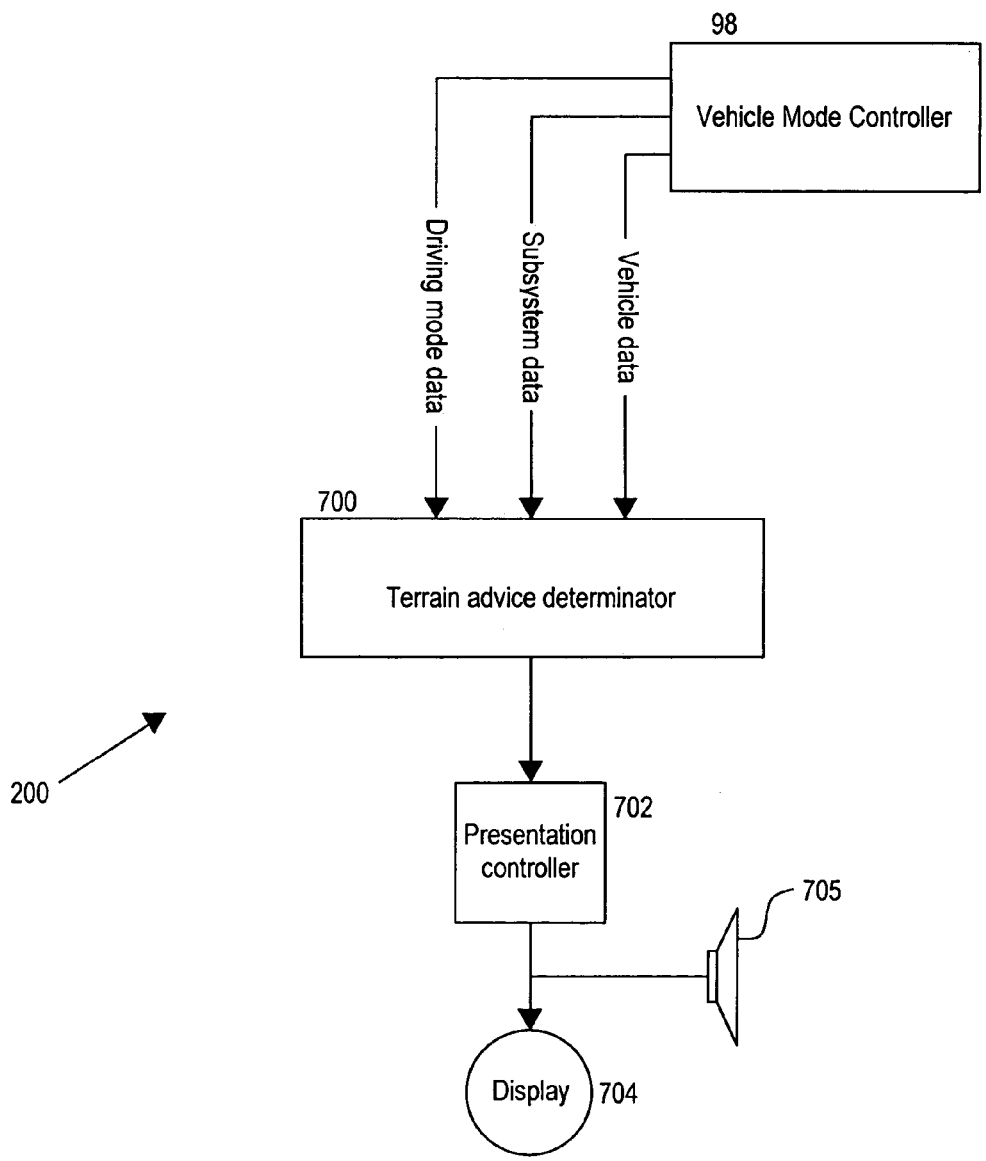
FIG. 9 is a representation of driving advice apparatus according to an embodiment of the invention.

FIG. 9 further describes a preferred embodiment of the driving advice apparatus according to this invention. The driving advice apparatus 200 includes a terrain advice determinator 700, a presentation controller 702, a display 704 and a loudspeaker 705. The terrain advice determinator 700 collects information from the vehicle mode controller to establish the current state of the vehicle. Information collected from the vehicle mode controller 98 comprises the currently selected driving mode, the current configurations of the subsystems and vehicle data such as vehicle speed. Once the current state of the vehicle is identified, it cross-references the results with a software based tables pre-loaded with driving advice.

The terrain advice determinator 700 outputs a message request signal which exists in the form of 8 bits and so can have 255 different values. The message request is decoded by the presentation controller 702. Each value of the message request relates to a specific message in a look up table. The complete list of 255 messages has been arranged so that a (de)coding proposal could be used to compile or decode the message request value.

In addition to outputting visual message requests, the terrain advice determinator 700 sends an audible warning request to the presentation controller 702. The terrain advice determinator will either request no audible warning (value 0), a single chime (value 1), a double chime (value 2) or a continuous chime (value 3). The presentation controller 702 then sends the appropriate signals to the loudspeaker 705 and the display 704.

Referring to FIGS. 5 and 6, in one example the driving mode data indicates that the driving mode is Mud/Ruts mode. The suspension subsystem data indicates that the vehicle is at standard ride height. The vehicle data indicates that the vehicle is not traveling above the threshold speed. The terrain advice determinator then determines from the look up table that the message "Consider air suspension high for deep mud/ruts" is appropriate. The presentation controller then sends this message to the display 704 for viewing by the driver.

We claim:

1. A vehicle control system for a vehicle which is operable in a plurality of driving modes, the system comprising;
   a driving mode selector for providing a requested driving mode;
   a vehicle mode controller adapted to receive said requested driving mode from the driving mode selector;

at least one vehicle subsystem operable in a plurality of subsystem configuration modes, each adapted to receive from the vehicle mode controller the requested driving mode and to send continuously to said vehicle mode controller a status message indicating its current subsystem configuration and its ability to change to said requested driving mode; and wherein the vehicle mode controller is operable to communicate continuously said requested driving mode to each vehicle subsystem to initiate an evaluation of each subsystem configuration mode status and its ability to change modes, to initiate simultaneously the change of all of the at least one vehicle subsystems to said requested driving mode upon affirmative completion of said evaluation, and to confirm that all of said vehicle subsystems have changed to said requested driving mode.

2. A vehicle control system as claimed in claim 1, further comprising:
a manual subsystem control means connected to a vehicle subsystem in which the vehicle subsystem is further adapted to receive;
a manual subsystem control request from the manual subsystem control means and to determine an appropriate subsystem configuration mode for the requested driving mode.

3. A vehicle control system as in claim 1 further comprising a driving advice apparatus adapted for collecting driving mode data, vehicle data and subsystem data and for identifying the optimal driving advice that matches the vehicle performance for the current driving mode and for presenting the driving advice to the driver.

4. A system according to claim 1 wherein one of the vehicle subsystems is an air suspension system.

5. A system according to claim 1 wherein one of the vehicle subsystems is a transmission system.

6. A system according to claim 1 wherein one of the vehicle subsystems is an engine management system.

7. A system according to claim 6 wherein the engine management system is configured to select a throttle map dependent on the requested driving mode and to effect a gradual change-over from one throttle map to another in a manner dependent upon a measured throttle pedal position.

8. A system according to claim 1 wherein one of the vehicle subsystems is a brake system.

9. A system according to claim 1 wherein one of the vehicle subsystems is a steering system.

10. A vehicle comprising a system according to claim 1.

11. A method of vehicle control in which the vehicle is provided with a vehicle mode controller, a driving mode selector and at least one vehicle subsystem, the method comprising the steps of:
receiving a requested driving mode in the vehicle mode controller from the driving mode selector,
communicating continuously said requested driving mode from the vehicle mode controller to each vehicle subsystem,
receiving in each vehicle subsystem from the requested driving mode from the vehicle mode controller,
sending continuously from each vehicle subsystem to said vehicle mode controller a status message indicating its current subsystem configuration mode and its ability to change to said requested driving mode,
initiating in the vehicle mode controller an evaluation of each subsystem configuration mode status and its ability to change mode, initiating in the vehicle mode controller the simultaneous change of all vehicle subsystems to said requested driving mode upon affirmative completion of said evaluation, and
confirming in the vehicle mode controller that all of said vehicle subsystems have changed to said driving mode.

12. A method according to claim 11 comprising the further steps of:
connecting a manual subsystem control means to a vehicle subsystem,
receiving a manual subsystem control request in said vehicle subsystem from the manual subsystem control means, and
determining in said vehicle subsystem an appropriate subsystem configuration for the requested driving mode.

13. A method of vehicle control as claimed in claim 11, wherein one of the vehicle subsystems is an air suspension system, and a method for controlling said air suspension system comprises the steps of:
receiving a requested driving mode by said air suspension system from said vehicle mode controller,
receiving a driver requested input from a manual subsystem control means by said air suspension system;
comparing said requested driving mode from said vehicle controller and said driver requested input from said manual subsystem control means,
determining the control parameters suitable for the requested driving mode for said air suspension system,
implementing said control parameters for said air suspension system,
sending a continuous status message containing the parameters and the ability to change to a future driving mode of said air suspension system, and
notifying said manual subsystem control means of said implemented control parameters.

14. A method as in claim 11 wherein one of said vehicle subsystems is a brake system and a method for controlling said brake system comprises the steps of:
receiving a requested driving mode by said brake system from said vehicle mode controller,
receiving a driver requested input from a manual subsystem control means by said brake system;
comparing said requested driving mode from said vehicle controller and said driver requested input from said manual subsystem control means,
determining the control parameters suitable for the requested driving mode for said brake system,
implementing said control parameters for said brake system,
sending a continuous status message containing the parameters and the ability to change to a future driving mode of said brake system, and
notifying said manual subsystem control means of said implemented control parameters.

15. A method as in claim 14, wherein the brake system includes a hill descent control function.

16. A method as in claim 15, wherein a method for controlling the hill descent control function comprises the steps of:
receiving a requested driving mode by said brake system from said vehicle mode controller,
receiving a driver requested input from a manual hill descent control device by said brake system;
comparing said requested driving mode from said vehicle controller and said driver requested input from said manual hill descent control device,
determining the hill descent control parameters suitable for the requested driving mode for said brake system, implementing said hill descent control parameters for said brake system, sending a continuous status message containing the parameters and the ability to change to a future driving mode of said brake system, and notifying said manual hill descent control device of said implemented control parameters.

17. A method of vehicle control according to claim 11, further comprising the step of providing vehicle driving advice to the driver by means of a presentation device.

18. A method of vehicle control as claimed in claim 17, wherein a method for providing vehicle driving advice comprises the further steps of:

collecting driving mode data, vehicle data and subsystem data;

identifying the optimal driving advice for the vehicle for the current driving mode, and presenting the driving advice on a presentation device.

* * * * *